United States Patent
Sakurada et al.

(10) Patent No.: US 11,948,451 B2
(45) Date of Patent: Apr. 2, 2024

(54) INFORMATION PROCESSING DEVICE, INFORMATION PROCESSING SYSTEM, INFORMATION PROCESSING METHOD, AND DISPLAY DEVICE

(71) Applicant: TOYOTA JIDOSHA KABUSHIKI KAISHA, Toyota (JP)

(72) Inventors: Shin Sakurada, Toyota (JP); Kazuya Nishimura, Anjo (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/559,932

(22) Filed: Dec. 22, 2021

(65) Prior Publication Data

US 2022/0270475 A1    Aug. 25, 2022

(30) Foreign Application Priority Data

Feb. 22, 2021    (JP) ................................. 2021-026622

(51) Int. Cl.
| | |
|---|---|
| *G08G 1/005* | (2006.01) |
| *G06V 20/20* | (2022.01) |
| *G06V 40/10* | (2022.01) |
| *G06V 40/20* | (2022.01) |
| *G08G 1/01* | (2006.01) |
| *G08G 1/052* | (2006.01) |
| *G08G 1/07* | (2006.01) |

(52) U.S. Cl.
CPC ............. *G08G 1/005* (2013.01); *G06V 20/20* (2022.01); *G06V 40/10* (2022.01); *G06V 40/25* (2022.01); *G08G 1/0145* (2013.01); *G08G 1/052* (2013.01); *G08G 1/07* (2013.01)

(58) Field of Classification Search
CPC ...... G08G 1/005; G08G 1/0145; G08G 1/052; G08G 1/07; G07C 5/008; G07C 5/0808; G07C 2205/02; G07C 5/006; G07C 5/0825; B60R 2021/0027; G06V 20/20; G06V 40/10; G06V 40/25
See application file for complete search history.

(56) References Cited

U.S. PATENT DOCUMENTS

| | | | |
|---|---|---|---|
| 5,734,339 A | 3/1998 | Ogle | |
| 6,384,742 B1 | 5/2002 | Harrison | |
| 10,272,830 B2 | 4/2019 | Suzuki et al. | |
| 10,733,893 B1 * | 8/2020 | Swan | G08G 1/166 |

(Continued)

FOREIGN PATENT DOCUMENTS

| | | |
|---|---|---|
| CN | 206388322 U | 8/2017 |
| CN | 208156864 U | 11/2018 |

(Continued)

OTHER PUBLICATIONS

Aug. 17, 2023 Office Action issued in U.S. Appl. No. 17/666,697.
Nov. 30, 2023 Notice of Allowance issued in U.S. Appl. No. 17/666,697.

*Primary Examiner* — Sisay Yacob
(74) *Attorney, Agent, or Firm* — Oliff PLC

(57) ABSTRACT

An information processing device includes a control unit that controls display of a crosswalk on a road on which a vehicle travels. The control unit outputs information for displaying the crosswalk in a range that is determined based on a state of a pedestrian crossing the road.

17 Claims, 7 Drawing Sheets

(56) References Cited

U.S. PATENT DOCUMENTS

| | | | |
|---|---|---|---|
| 10,981,507 B1 | 4/2021 | Benjamin et al. | |
| 11,017,661 B1 | 5/2021 | Beauchamp et al. | |
| 2005/0104747 A1 | 5/2005 | Silic et al. | |
| 2005/0270175 A1* | 12/2005 | Peddie | G08G 1/096783 |
| | | | 246/473 R |
| 2009/0091474 A1 | 4/2009 | Konforty et al. | |
| 2010/0102991 A1* | 4/2010 | Hernandez | G08G 1/005 |
| | | | 340/944 |
| 2014/0285364 A1 | 9/2014 | Chen | |
| 2015/0084791 A1 | 3/2015 | Jang | |
| 2016/0148511 A1 | 5/2016 | Shibata et al. | |
| 2017/0301268 A1* | 10/2017 | Laforce | G09F 13/005 |
| 2018/0075748 A1 | 3/2018 | Park et al. | |
| 2018/0118099 A1 | 5/2018 | Kunii et al. | |
| 2019/0031198 A1 | 1/2019 | Aoki et al. | |
| 2019/0035262 A1 | 1/2019 | Brady et al. | |
| 2019/0088112 A1 | 3/2019 | Jung et al. | |
| 2019/0139414 A1 | 5/2019 | Morimura et al. | |
| 2019/0193626 A1 | 6/2019 | Park | |
| 2019/0287403 A1* | 9/2019 | Aoude | G08G 1/166 |
| 2020/0198534 A1 | 6/2020 | Ito et al. | |
| 2020/0265719 A1* | 8/2020 | Swan | G08G 1/166 |
| 2021/0182576 A1 | 6/2021 | Kuriyama | |
| 2021/0256933 A1 | 8/2021 | Kurebayashi et al. | |
| 2021/0316750 A1 | 10/2021 | Jo | |
| 2022/0258758 A1 | 8/2022 | Fujimoto et al. | |
| 2022/0319316 A1 | 10/2022 | Sakurada et al. | |
| 2022/0379806 A1 | 12/2022 | Spoor et al. | |

FOREIGN PATENT DOCUMENTS

| | | |
|---|---|---|
| CN | 10264754 A | 9/2019 |
| CN | 210777188 U | 6/2020 |
| CN | 111462474 A | 7/2020 |
| CN | 111806340 A | 10/2020 |
| JP | 2014-225151 A | 12/2014 |
| JP | 2020-097366 A | 6/2020 |

* cited by examiner

INFORMATION PROCESSING DEVICE, INFORMATION PROCESSING SYSTEM, INFORMATION PROCESSING METHOD, AND DISPLAY DEVICE

CROSS-REFERENCE TO RELATED APPLICATION

This application claims priority to Japanese Patent Application No. 2021-026622 filed on Feb. 22, 2021, incorporated herein by reference in its entirety.

BACKGROUND

1. Technical Field

The present disclosure relates to an information processing device, an information processing system, an information processing method, and a display device.

2. Description of Related Art

A technique for notifying surrounding vehicles of presence of a crosser when a pedestrian starts crossing a point on a road is known (for example, see Japanese Unexamined Patent Application Publication No. 2014-225151 (JP 2014-225151 A)).

SUMMARY

When a crosswalk is displayed on a point on a road to cause a pedestrian to cross the road, vehicles cannot pass until one crosser finishes crossing the wide road, which is not efficient. It is desired to increase convenience of pedestrians crossing the road while reducing the impact on the traffic of vehicles.

In view of the above circumstances, it is an object of the present disclosure to increase the convenience of pedestrians crossing the road while reducing the impact on the traffic of vehicles.

An information processing device according to a first aspect of the present disclosure includes a control unit that controls display of a crosswalk on a road on which a vehicle travels. The control unit outputs information for displaying the crosswalk in a range that is determined based on a state of a pedestrian crossing the road.

An information processing system according to a second aspect of the present disclosure includes: the information processing device according to the first aspect; and a display device that displays information output from the information processing device.

An information processing method according to a third aspect of the present disclosure controls display of a crosswalk on a road on which a vehicle travels. The information processing method includes outputting information on a crosswalk to be displayed in a range that is determined based on a state of a pedestrian crossing the road.

A display device according to a fourth aspect of the present disclosure includes: a crosswalk display unit that displays a crosswalk on a road on which a vehicle travels; and a display control unit that controls the crosswalk display unit. Based on information on a crosswalk to be displayed in a range that is determined based on a state of a pedestrian crossing the road, the display control unit causes the crosswalk display unit to display the crosswalk. The information on the crosswalk is acquired from the information processing device.

With the information processing device, the information processing system, the information processing method, and the display device according to the aspects of the present disclosure, it is possible to increase the convenience of pedestrians crossing the road and reduce the impact on the traffic of the vehicles.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration Example of Information Processing System 1

Figure 1:
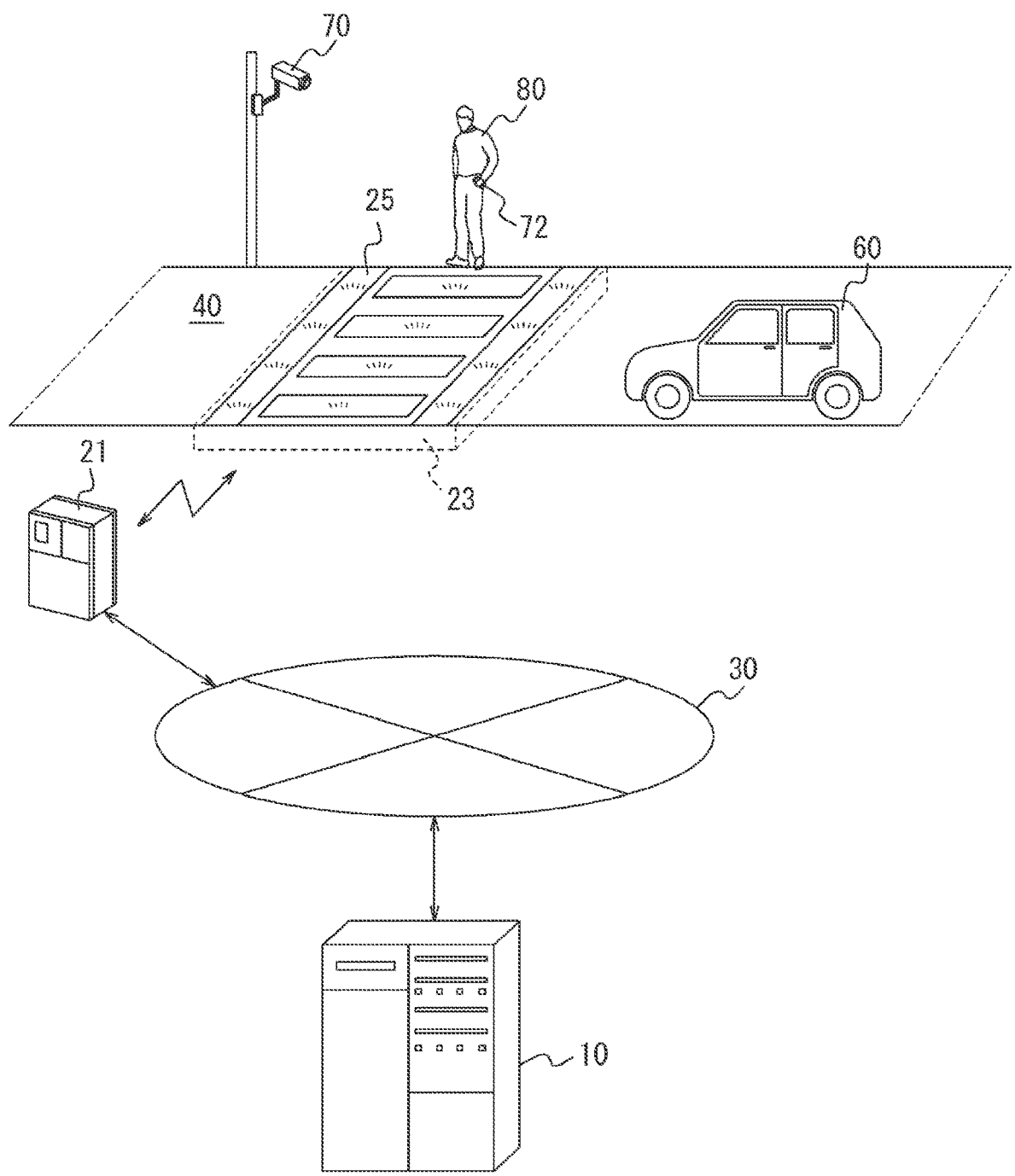
FIG. 1 is a schematic diagram showing a configuration example of an information processing system according to an embodiment of the present disclosure.
Figure 2:
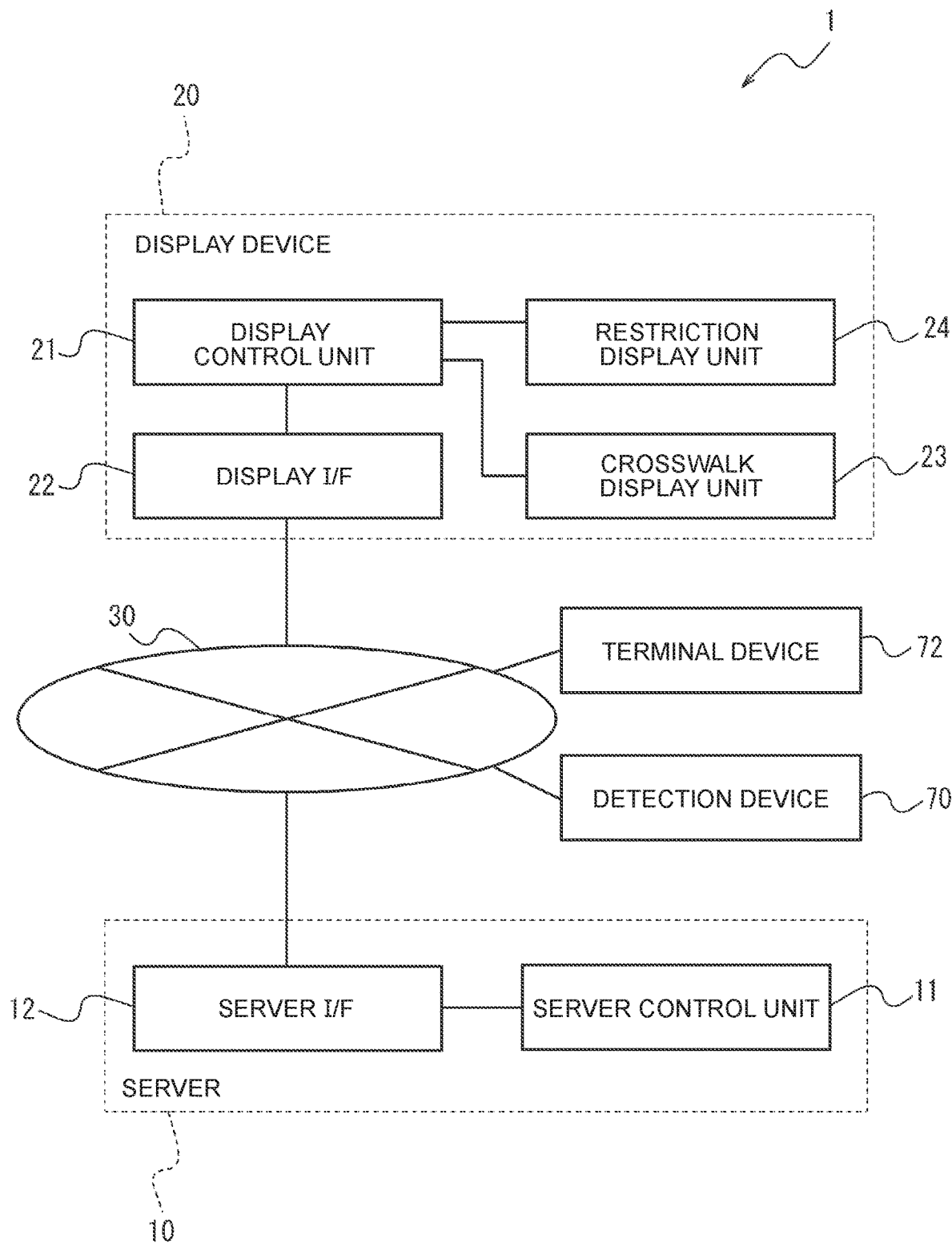
FIG. 2 is a block diagram showing the configuration example of the information processing system according to the embodiment.

As shown in FIGS. 1 and 2, an information processing system 1 according to an embodiment of the present disclosure includes a server 10 and a display device 20. The display device 20 is configured to display a crosswalk 25 on a road 40 on which a vehicle 60 travels. A server 10 outputs information regarding a position or a timing at which the display device 20 displays the crosswalk 25. That is, the information processing system 1 controls display of the crosswalk 25 on the road 40. Hereinafter, a configuration example of the information processing system 1 will be described.

Server 10

The server 10 includes a server control unit 11 and a server interface 12. The server interface 12 is also referred to as a server I/F 12.

The server control unit 11 controls each component of the server 10. The server control unit 11 is also simply referred to as a control unit. The server control unit 11 may be configured to include one or more processors. In this embodiment, the "processor" is, but not limited to, a general-purpose processor, a dedicated processor specialized for specific processing, and the like. The server control unit 11 may be configured to include one or more dedicated circuits. The dedicated circuit may include, for example, a field-programmable gate array (FPGA) or an application-specific integrated circuit (ASIC). The server control unit 11 may be configured to include the dedicated circuit instead of the processor, or may be configured to include the dedicated circuit together with the processor.

The server 10 may further include a storage unit. The storage unit is, for example, a semiconductor memory, a magnetic memory, or an optical memory. However, the storage unit is not limited thereto. The storage unit may function as, for example, a main storage device, an auxiliary storage device, or a cache memory. The storage unit may include an electromagnetic storage medium such as a magnetic disk. The storage unit stores any information used for the operation of the server 10. The storage unit may store, for example, a system program, an application program, or the like. The storage unit may be included in the server control unit 11.

The server I/F 12 outputs information, data, or the like from the server control unit 11, or inputs information, data, or the like to the server control unit 11. The server I/F 12 is also simply referred to as an interface or I/F.

The server I/F 12 may include a communication module configured to be able to communicate with the display device 20 via a network 30. The communication module may include a communication module conforming to mobile communication standards such as the fourth generation (4G) or the fifth generation (5G). However, the communication module is not limited to this. The server I/F 12 may be configured to be connectable to the communication module.

The server 10 may include one server device or a plurality of server devices that can communicate with each other. The server 10 is also referred to as an information processing device.

Display Device 20

The display device 20 includes a display control unit 21, a display interface 22, and a crosswalk display unit 23. The display interface 22 is also referred to as a display I/F 22.

The display control unit 21 controls each component of the display device 20. The display control unit 21 is also simply referred to as a control unit. The display control unit 21 may be configured to be the same as or similar to the server control unit 11 of the server 10. The display control unit 21 may be configured to include one or more processors. The display control unit 21 may be configured to include one or more dedicated circuits. The dedicated circuit may include, for example, an FPGA or an ASIC. The display control unit 21 may be configured to include the dedicated circuit instead of the processor, or may be configured to include the dedicated circuit together with the processor.

The display device 20 may further include a storage unit. The storage unit of the display device 20 may be configured to be the same as or similar to the storage unit of the server 10. The storage unit is, for example, a semiconductor memory, a magnetic memory, or an optical memory. However, the storage unit is not limited thereto. The storage unit may function as, for example, a main storage device, an auxiliary storage device, or a cache memory. The storage unit may include an electromagnetic storage medium such as a magnetic disk. The storage unit stores any information that is used for operation of the display device 20. The storage unit may store, for example, a system program, an application program, or the like. The storage unit may be included in the display control unit 21.

The display I/F 22 outputs information, data, or the like from the display control unit 21, or inputs information, data, or the like to the display control unit 21. The display I/F 22 is also simply referred to as an interface or I/F.

The display I/F 22 may be configured to be the same as or similar to the server I/F 12. The display I/F 22 may include a communication module configured to be able to communicate with the server 10 via the network 30. The communication module may include a communication module conforming to mobile communication standards such as the 4G or the 5G. However, the communication module is not limited thereto. The display I/F 22 may be configured to be connectable to the communication module.

The crosswalk display unit 23 is configured to display the crosswalk 25 on the road surface of the road 40. For example, as shown in FIG. 1, the crosswalk display unit 23 may be configured to include a light source provided so as to be embedded in the road surface of the road 40. The light source may be configured to include a light emitting device such as a light emission diode (LED) or a laser diode (LD). The light source may be configured to include, for example, a light bulb or a fluorescent lamp. The manner in which the light source is provided to the road 40 is not limited to the example of FIG. 1.

The crosswalk display unit 23 may be further configured to include a diffusing plate or the like for diffusing the light emitted from the light source so that the driver of the vehicle 60 traveling on the road 40 or the pedestrian 80 crossing the road 40 can easily visually recognize the light emitted from the light source.

The display device 20 further includes a restriction display unit 24, although it is not essential. When crossing of the road 40 by the pedestrian 80 is restricted, the restriction display unit 24 operates such that the pedestrian 80 who may cross the road 40 recognizes that the crossing is restricted. Specifically, the restriction display unit 24 is installed at an entrance to enter the road 40 from the side of the road 40. The restriction display unit 24 may display an image corresponding to a restriction indication 27 (see FIG. 5) at the entrance to the road 40 so that the pedestrian 80 who may cross the road 40 recognizes that the crossing is restricted. The restriction display unit 24 may place an obstacle such as fence or a pole or close a door, a gate, or the like as displaying the restriction indication 27 so that the pedestrian 80 who may cross the road 40 recognizes that the crossing is restricted.

The number of display devices 20 included in the information processing system 1 is not limited to one, and may be two or more. The information processing system 1 may include the display device 20 including both the crosswalk display unit 23 and the restriction display unit 24. The information processing system 1 may include the display device 20 including the crosswalk display unit 23 but not including the restriction display unit 24. The information processing system 1 may include the display device 20 including the restriction display unit 24 but not including the crosswalk display unit 23.

Configuration for Detecting Pedestrian 80

The information processing system 1 may display the crosswalk 25 on the road 40 when there is the pedestrian 80 who may cross the road 40. The information processing system 1 may detect the pedestrian 80 located within a predetermined distance from the road 40 and determine whether the detected pedestrian 80 may cross the road 40.

The information processing system 1 further includes, although not essential, a detection device 70 as a configuration for detecting the pedestrian 80 located within the predetermined distance from the road 40. The detection device 70 may be configured to include a sensor that can detect the presence of the pedestrian 80, such as a camera or a human sensor, for example. The detection device 70 may be installed, for example, in the vicinity of the road 40. The detection device 70 may be configured to detect the walking speed, the position, and the like of the pedestrian 80. The walking speed, the position, and the like of the pedestrian 80 are also collectively referred to as a state of the pedestrian 80.

The detection device 70 may output the detection result of the pedestrian 80 to the server 10 via the network 30. The detection device 70 may output the detection result of the pedestrian 80 to the server 10 by, for example, short-range communication and the like without using the network 30. The detection result of the pedestrian 80 includes a detection result that the pedestrian 80 is located within the predetermined distance from the road 40. The detection result of the pedestrian 80 may further include a detection result of the state of the pedestrian 80. The server 10 may determine whether there is the pedestrian 80 who may cross the road 40 based on the detection result of the pedestrian 80. The server 10 may calculate the number of pedestrians 80 who may cross the road 40.

The information processing system 1 further includes a terminal device 72, although not essential, as a configuration for detecting the pedestrian 80 located within the predetermined distance from the road 40. The terminal device 72 is possessed by the pedestrian 80. The terminal device 72 may include, for example, a receiver compatible with the satellite positioning system such that the position information of the pedestrian 80 can be detected. The receiver compatible with the satellite positioning system may include, for example, a global positioning system (GPS) receiver.

The terminal device 72 may output the position information of the pedestrian 80 to the server 10 via the network 30. The terminal device 72 may output the position information of the pedestrian 80 to the server 10 by, for example, short-range communication and the like without using the network 30. The server 10 detects the pedestrian 80 located within the predetermined distance from the road 40 based on the position information of the pedestrian 80. The server 10 determines whether the detected pedestrian 80 may cross the road 40. The server 10 may calculate the number of pedestrians 80 who may cross the road 40.

The detection device 70 or the terminal device 72 may detect the pedestrian 80 who may cross the road 40 and output the detection result to the server 10. The detection device 70 or the terminal device 72 may calculate the number of pedestrians 80 who may cross the road 40 and further output the calculation result to the server 10.

Operation Example of Information Processing System 1

The information processing system 1 operates as described below, for example, to display the crosswalk 25 on the road 40 so that the pedestrian 80 can cross the road 40.

The server control unit 11 of the server 10 controls the display device 20 to display the crosswalk 25 on the road 40 on which the vehicle 60 travels. That is, the server control unit 11 controls the display of the crosswalk 25 on the road 40 on which the vehicle 60 travels. In addition, the server control unit 11 outputs information for displaying the crosswalk 25 in a range that is determined based on the state of the pedestrian 80 crossing the road 40. The server control unit 11 may generate control information of the display device 20 and output the control information to the display device 20 so as to cause the display device 20 to display the crosswalk 25. The display device 20 may display the crosswalk 25 on the road 40 with the crosswalk display unit 23 based on the control information.

The server control unit 11 determines the range in which the crosswalk 25 is to be displayed. Specifically, the server control unit 11 may determine the length of the crosswalk 25 to be displayed in the direction of crossing the road 40. The length of the crosswalk 25 to be displayed in the direction of crossing the road 40 is hereinafter referred to simply as the length of the crosswalk 25. The server control unit 11 may determine the length of the crosswalk 25 to be displayed to be the same as the width of the road 40.

The server control unit 11 may determine the length of the crosswalk 25 to be displayed to be shorter than the width of the road 40 so as to display the crosswalk 25 in part of the road 40 in the crossing direction. The crosswalk 25 may be displayed shorter than the width of the road 40 so as to provide a space for the vehicle 60 to pass. As a result, the period during which the passage of the vehicle 60 is restricted can be shortened.

The server control unit 11 may determine the length of the crosswalk 25, using the width of a lane of the road 40 as a unit. That is, the server control unit 11 may display the crosswalk 25 for each lane of the road 40. By displaying the crosswalk 25 by lane of the road 40, the lane in which the vehicle 60 can travel and the lane in which the vehicle 60 cannot travel can be clearly distinguished. This facilitates the vehicle 60 to travel.

The server control unit 11 may determine the range in which the crosswalk 25 is displayed based on the state of the pedestrian 80 crossing the road 40. For example, the server control unit 11 may determine the length of the crosswalk 25 based on the speed of the pedestrian 80. The server control unit 11 may determine the length of the crosswalk 25 to be displayed to be the same as the width of the road 40 when the speed at which the pedestrian 80 crosses the road 40 is equal to or higher than a predetermined speed. The server control unit 11 may determine the length of the crosswalk 25 to be displayed to be shorter than the width of the road 40 when the speed at which the pedestrian 80 crosses the road 40 is lower than the predetermined speed. The server control unit 11 may shorten the length of the crosswalk 25 to be displayed as the speed at which the pedestrian 80 crosses the road 40 is slower. By determining the length of the crosswalk 25 based on the speed of the pedestrian 80, both ensuring safety during crossing of the pedestrian 80 and ease of passage of the vehicle 60 can be realized.

Display Example of Crosswalk 25

Figure 3:
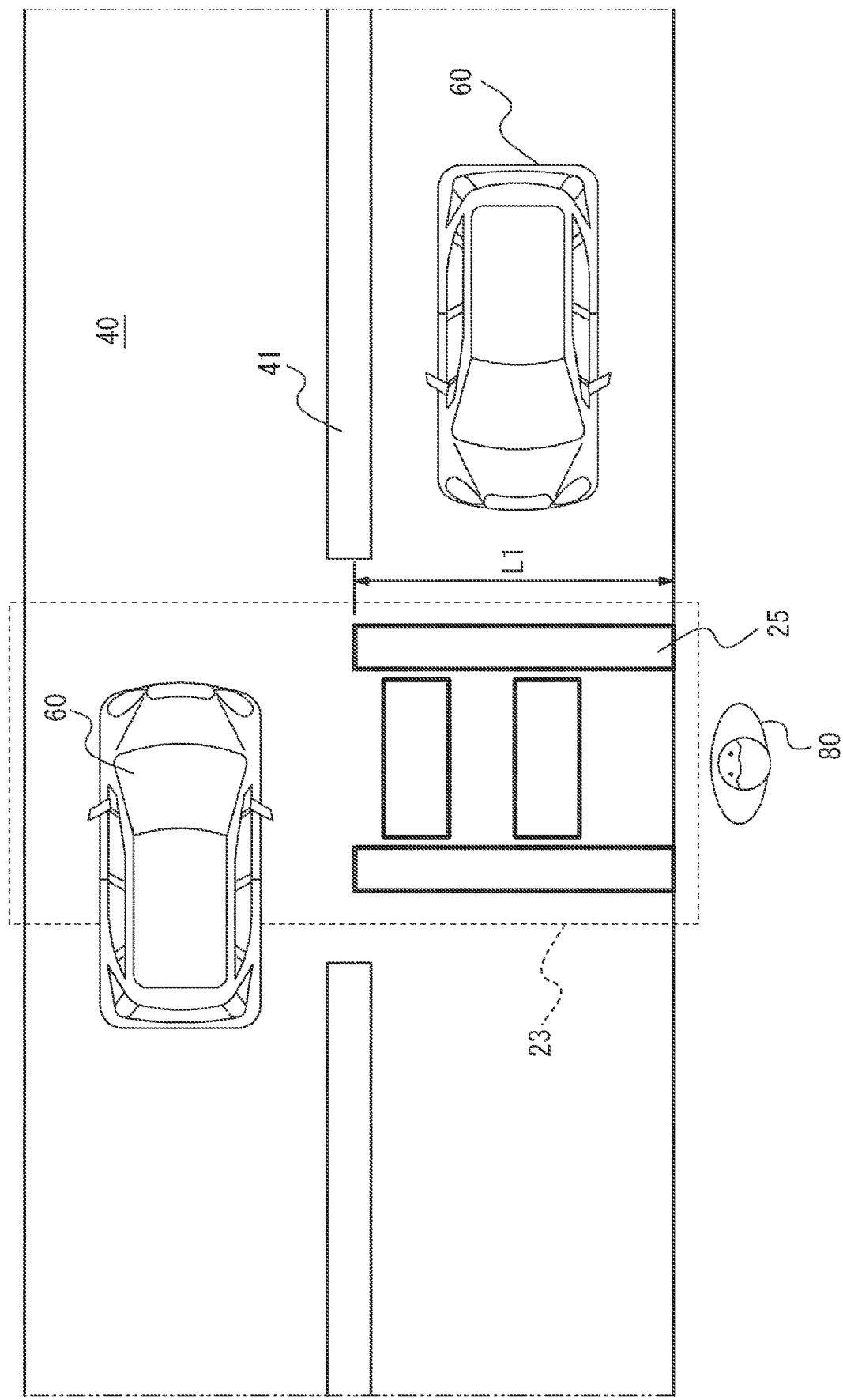
FIG. 3 is a diagram showing a display example of a crosswalk before start of crossing.
Figure 4:
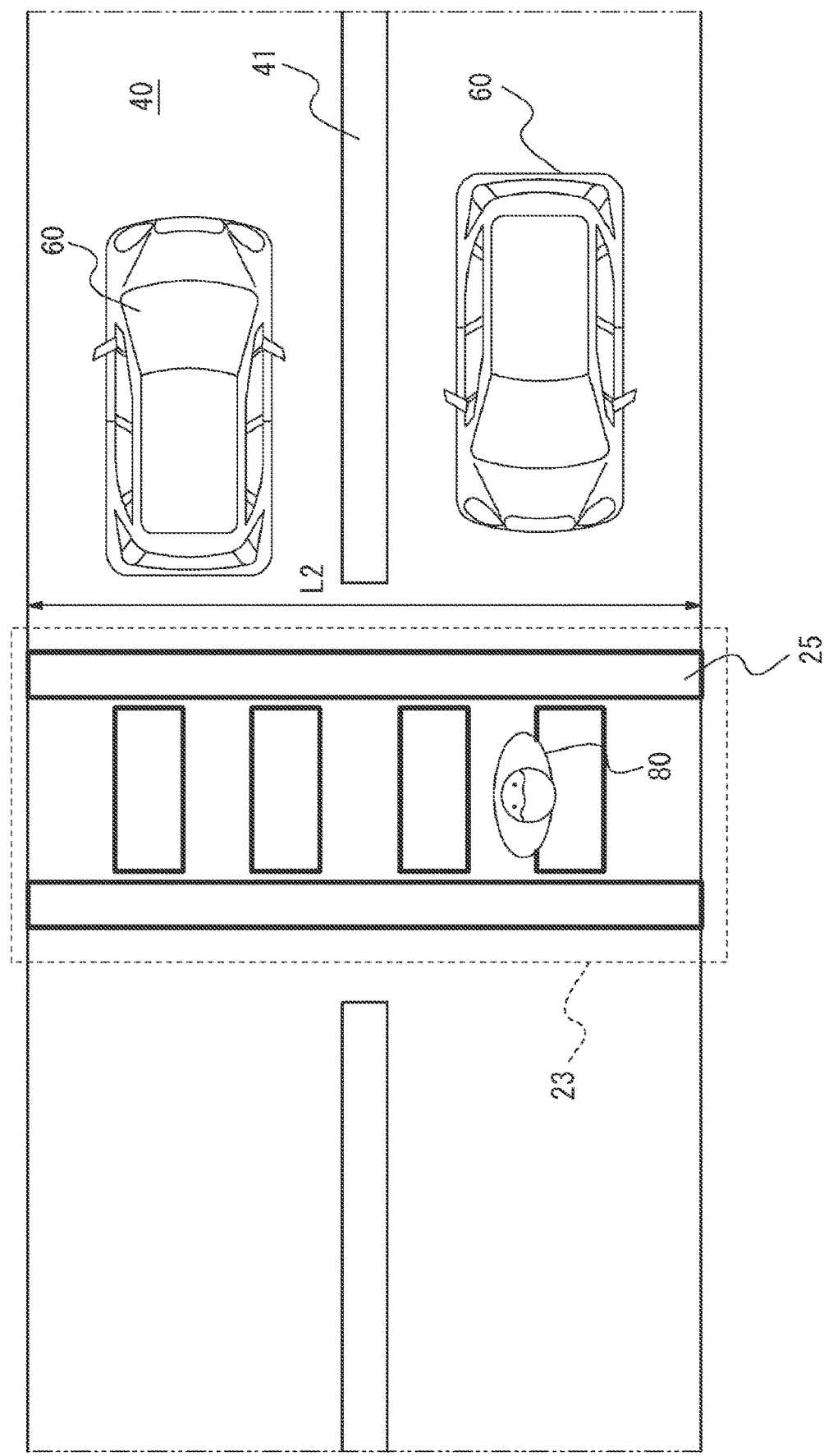
FIG. 4 is a diagram showing a display example of the crosswalk during crossing.
Figure 5:
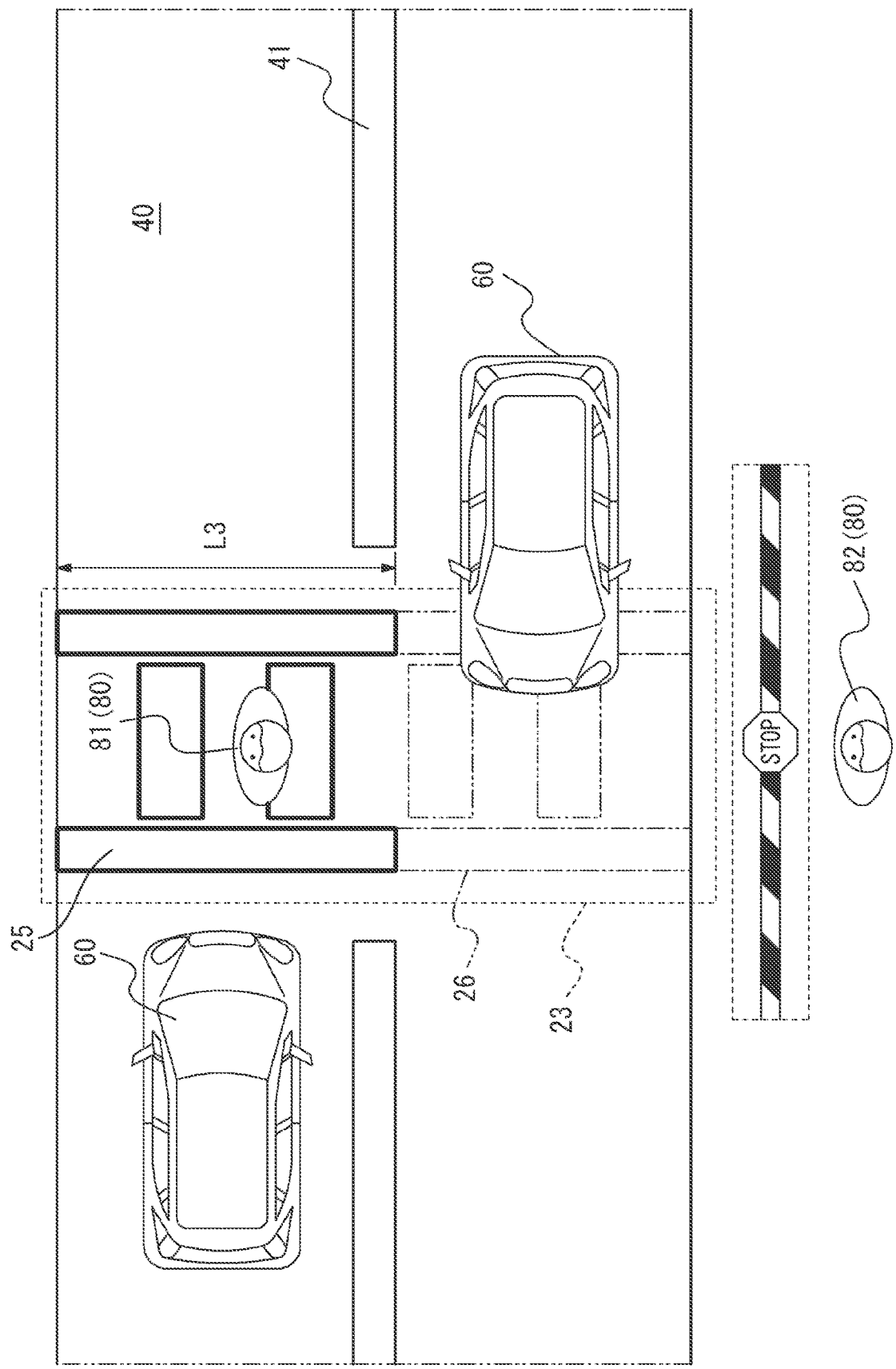
FIG. 5 is a diagram showing a display example of the crosswalk after passing through a predetermined range of the crosswalk.

As illustrated in FIGS. 3, 4, and 5, the server control unit 11 may determine the range in which the crosswalk 25 is displayed based on the position of the pedestrian 80. Assume that the road 40 has two lanes separated by a lane boundary line 41.

The server control unit 11 displays the crosswalk 25 in the lane on the pedestrian 80 side as illustrated in FIG. 3 when detecting the pedestrian 80 who may cross the road 40. In this case, the server control unit 11 may determine the length of the crosswalk 25 to be displayed as the width of the lane represented by L1. The server control unit 11 may appropriately determine the width of the crosswalk 25 (length in the direction along the road 40). The server control unit 11 may determine the width of the crosswalk 25 to be displayed so that the driver of the vehicle 60 can visually recognize the crosswalk 25. The server control unit 11 may determine the width of the crosswalk 25 to be displayed so that the range in which the crosswalk 25 is displayed is wider than the range that the pedestrian 80 passes through when crossing the road 40.

After the pedestrian 80 enters the crosswalk 25, the server control unit 11 displays the crosswalk 25 in the lane that the pedestrian 80 is going to enter next as illustrated in FIG. 4. In this case, the server control unit 11 may determine the length of the crosswalk 25 to be displayed as the width of the road 40 represented by L2.

After the pedestrian 80 has passed through part of the crosswalk 25, the server control unit 11 may erase the crosswalk 25 that the pedestrian 80 has passed through while continuing to display the crosswalk 25 in the lane that the pedestrian 80 has entered, as illustrated in FIG. 5. The erased crosswalk 26 is represented by a long dashed short dashed line. In other words, the server control unit 11 may determine the length of the crosswalk 25 to be displayed as the width of the lane represented by L3. Thus, erasing the crosswalk 25 that the pedestrian 80 has passed through facilitates the passage of the vehicle 60.

The server control unit 11 may erase the crosswalk 25 that the pedestrian 80 has passed through, after a predetermined time has elapsed since the pedestrian 80 passed through part of the crosswalk 25. The safety of the pedestrian 80 during crossing can be increased by erasing the crosswalk 25 after the predetermined time has elapsed since the pedestrian 80 passed through.

In FIG. 5, the pedestrian 80 crossing the crosswalk 25 first is represented as a first crosser 81. When the server control unit erases the crosswalk 25 that the first crosser 81 has passed through, the server control unit 11 may output information for causing the display device 20 to display the restriction indication 27 so as to hinder a second crosser 82 who may cross the crosswalk 25 next from entering the erased crosswalk 26. The restriction display unit 24 of the display device 20 displays an image of the restriction indication 27 or places an actual obstacle corresponding to the restriction indication 27 so that the second crosser 82 recognizes that the crossing of the road 40 is restricted. The restriction indication 27 can hinder the second crosser 82 from entering the erased crosswalk 26.

Before erasing the crosswalk 25 that the first crosser 81 has passed through, the server control unit 11 may output information for causing the display device 20 to display the restriction indication 27. In other words, the server control unit 11 may output information for erasing the crosswalk 25 after hindering the second crosser 82 from entering the crosswalk 25 to be erased. This can increase the safety of the pedestrian 80.

Figure 6:
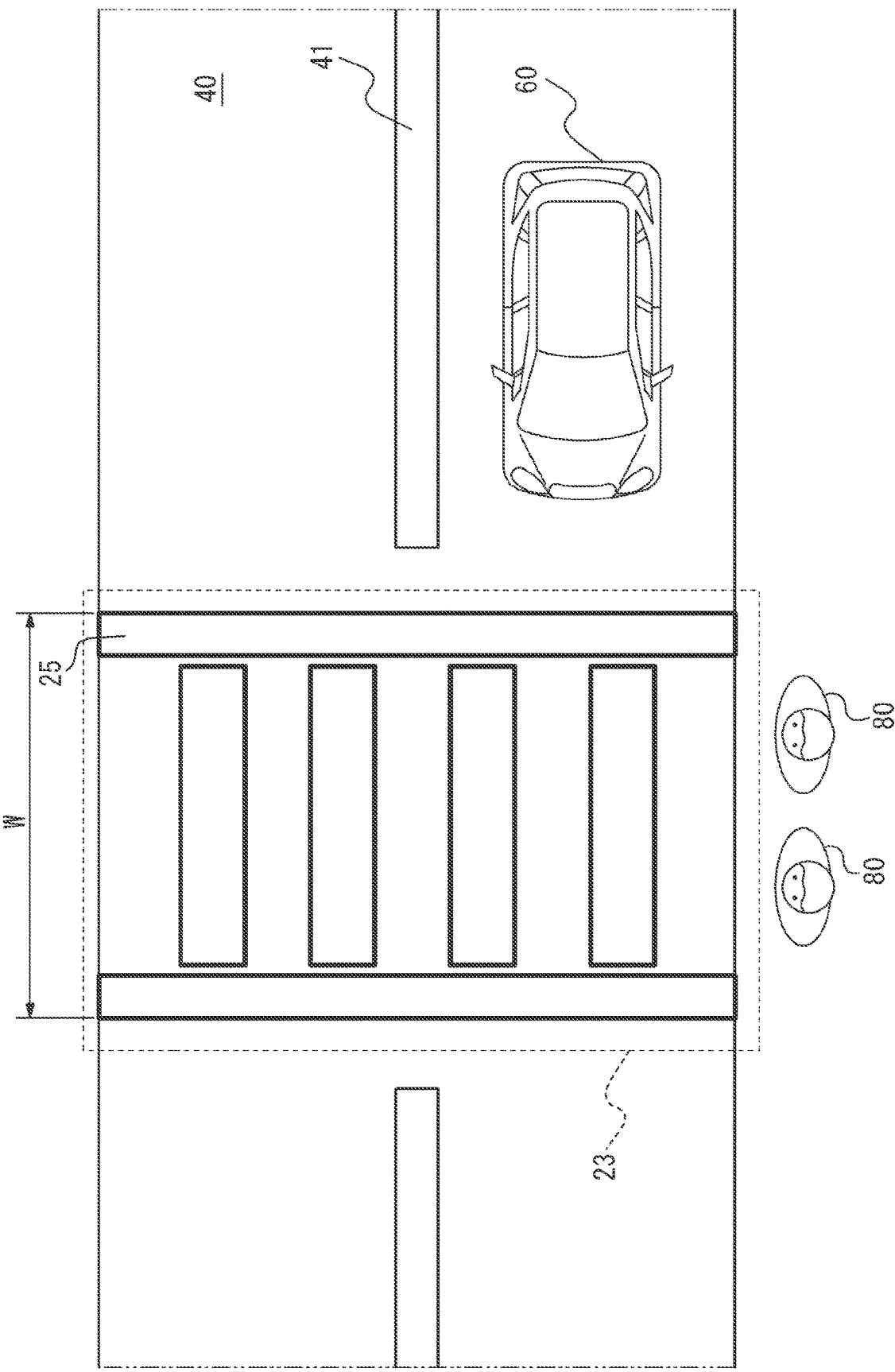
FIG. 6 is a diagram showing an example of determining the width of the crosswalk based on the number of pedestrians.

The server control unit 11 may determine the width (W) of the crosswalk 25 to be displayed based on the number of pedestrians 80 who may cross the crosswalk 25, as illustrated in FIG. 6. Specifically, the server control unit 11 may increase the width (W) of the crosswalk 25 to be displayed as the number of pedestrians 80 who may cross the crosswalk 25 increases. The server control unit 11 may set an upper limit on the width (W) of the crosswalk 25 to be displayed. The server control unit 11 may determine the width (W) of the crosswalk 25 to be displayed based on the distribution of the positions of the pedestrians 80 who may cross the crosswalk 25.

Procedure Example of Information Processing Method

Figure 7:
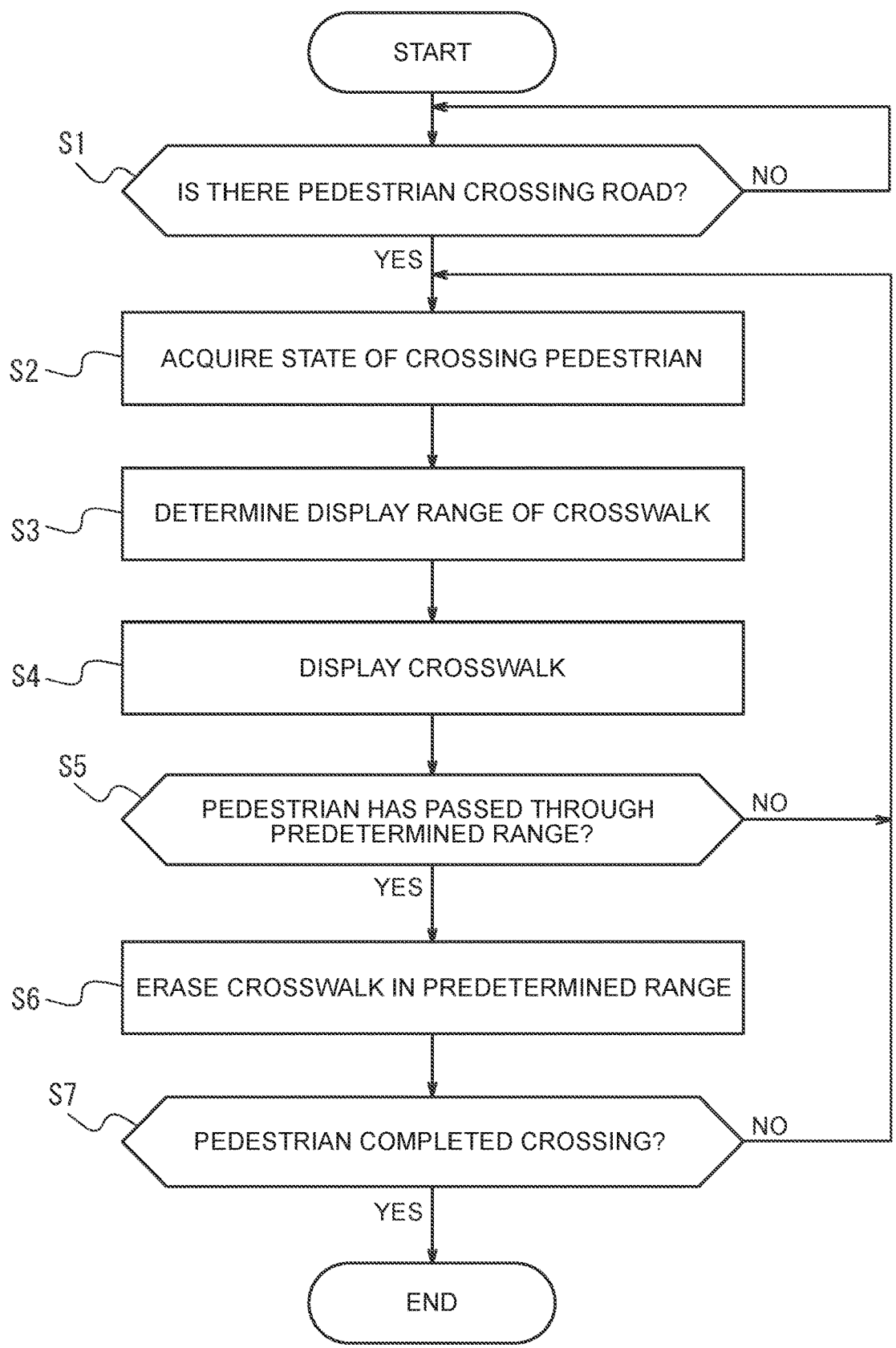
FIG. 7 is a flowchart showing a procedure example of an information processing method according to the embodiment.

The server control unit 11 may execute an information processing method including the procedure of a flowchart illustrated in FIG. 7. The information processing method may be realized as an information processing program that is executed by a processor constituting the server control unit 11.

The server control unit 11 determines whether there is the pedestrian 80 who may cross the road 40 (step S1). Specifically, the server control unit 11 may detect the pedestrian 80 who may cross the road 40 based on the information acquired from the detection device 70 or the terminal device 72. When there is no pedestrian 80 who may cross the road 40 (step S1: NO), the server control unit 11 repeats the determination procedure of step S1.

When there is the pedestrian 80 who may cross the road 40 (step S1: YES), the server control unit 11 acquires the state of the pedestrian 80 who may cross the road 40 (step S2). Specifically, the server control unit 11 may detect the walking speed, the position, or the like of the pedestrian 80 who may cross the road 40 as the state of the pedestrian 80, based on the information acquired from the detection device 70 or the terminal device 72.

The server control unit 11 determines the display range of the crosswalk 25 based on the state of the pedestrian 80 who may cross the road 40 (step S3). The server control unit 11 outputs information for displaying the crosswalk 25 in the determined display range to the display device 20 (step S4).

The server control unit 11 determines whether the pedestrian 80 who entered the displayed crosswalk 25 has passed through the predetermined range (step S5). When the pedestrian 80 has not passed through the predetermined range (step S5: NO), the server control unit 11 returns to the procedure of step S2. When the pedestrian 80 has passed through the predetermined range (step S5: YES), the server control unit 11 outputs information for erasing the crosswalk 25 displayed in the predetermined range (step S6).

The server control unit 11 determines whether the pedestrian 80 has completed crossing of the road 40 (step S7). When the pedestrian 80 has not completed the crossing of the road 40 (step S7: NO), the server control unit 11 returns to the procedure of step S2. When the pedestrian 80 has completed the crossing of the road 40 (step S7: YES), the server control unit 11 ends the execution of the procedure of the flowchart in FIG. 7.

Summary

As described above, the information processing system 1 according to the present embodiment displays the crosswalk 25 on the road 40 based on the state of the pedestrian 80 who may cross the road 40. This can increase the convenience of the pedestrian 80 crossing the road 40 and reduce the impact on the passage of the vehicle 60.

Other Embodiments

The information processing system 1 is not limited to the above-described embodiment, and may be realized in various other modes. Hereinafter, other embodiments will be described.

Advance Notice of Display of Crosswalk 25

The server control unit 11 may provide the driver of the vehicle 60 with an advance notice of display of the crosswalk 25 before displaying the crosswalk 25 on the road 40. Specifically, the server control unit 11 may output information for displaying the advance notice of display of the crosswalk 25 in the range in which the crosswalk 25 is newly displayed. The server control unit 11 may cause the display device 20 disposed at a position to display the crosswalk 25 or a position before the position to display the crosswalk 25 as seen from the vehicle 60 to display the advance notice of display of the crosswalk 25. The server control unit 11 may cause a navigation device or the like mounted on the vehicle 60 to display the advance notice of display of the crosswalk 25. By displaying the advance notice of display of the crosswalk 25, the impact on the traffic of the vehicle 60 can be reduced.

Determination of Pedestrian 80

As described above, the server control unit 11 may determine that the pedestrian 80 may cross the road 40 when the pedestrian 80 is located within the predetermined distance from the road 40. The server control unit 11 may determine whether the pedestrian 80 has an intention to cross the road 40, as well as determine whether the pedestrian 80 may cross the road 40. Specifically, the server control unit 11 may determine whether the pedestrian 80 has an intention to cross the road 40 based on the motion of the pedestrian 80. The server control unit 11 may determine that the pedestrian 80 has an intention to cross the road 40, when the server control unit 11 has detected the motion of the pedestrian 80 of staying on the side of the road 40 for a predetermined time or more or watching the vehicle 60 coming along the road 40, for example. By determining whether the pedestrian 80 has an intention to cross the road 40, unnecessary display of the crosswalk 25 can be reduced. As a result, the impact on the traffic of the vehicle 60 can be reduced.

Display Example of Restriction Indication 27

The server control unit 11 may output information for displaying the restriction indication 27 by a hologram. In this case, the restriction display unit 24 of the display device 20 is configured to be able to display a hologram. The server control unit 11 may output information for displaying the restriction indication 27 such that the second crosser 82 can visually recognize the restriction indication 27 as augmented reality. In this case, it is assumed that the second crosser 82 is wearing an augmented reality (AR) device such as AR glasses as the restriction display unit 24. The server control unit 11 may output the information for displaying the restriction indication 27 on the AR glasses of the second crosser 82. This makes it difficult for the second crosser 82 to enter the erased crosswalk 26. As a result, the safety of the pedestrian 80 can be increased.

Display Example of Crosswalk 25

The display device 20 may be configured to include the AR device as the crosswalk display unit 23 such that both the driver of the vehicle 60 traveling on the road 40 and the pedestrian 80 crossing the road 40 can visually recognize the crosswalk 25 as augmented reality. The crosswalk display unit 23 may be configured as, for example, a navigational device or a head-up display (HUD) mounted on the vehicle 60. The crosswalk display unit 23 may be configured, for example, as AR glasses worn by the pedestrian 80.

The crosswalk display unit 23 may be configured to include a projector that projects an image of the crosswalk 25 to the road surface of the road 40.

The manner in which the crosswalk display unit 23 is installed on the road 40 is not limited, which can increase the flexibility of installation of the crosswalk display unit 23.

Integration of Server 10 and Display Device 20

The function of the server 10 controlling the display of the crosswalk 25 described above may be realized by the display device 20. That is, the server 10 and the display device 20 may be integrated. In this case, the display device 20 may detect the pedestrian 80 who may cross the road 40 based on the detection result acquired from the terminal device 72 or the detection device 70 without acquiring the information from the server 10, to control the display of the crosswalk 25. The display control unit 21 of the display device 20 outputs the information for displaying the crosswalk 25 to the crosswalk display unit 23.

Embodiments of the present disclosure have been described with reference to the drawings and examples. However, it should be noted that those skilled in the art can make various modifications and alterations based on the present disclosure. It should be noted, therefore, that these modifications and alterations are within the scope of the present disclosure. For example, the functions and the like included in respective units, respective steps, or the like can be rearranged so as not to be logically inconsistent with each other. It is also possible to combine a plurality of units or steps into one or divide one unit or step into a plurality of units or steps.

What is claimed is:

1. An information processing device comprising:
a control unit that controls display of a crosswalk on a road on which a vehicle travels, wherein:
the control unit outputs information for displaying the crosswalk in a range that is determined based on a state of a pedestrian crossing the road; and
the control unit determines a length of the crosswalk to be displayed in a direction of crossing the road, based on a speed of the pedestrian crossing the road.

2. The information processing device according to claim 1, wherein the control unit determines the length of the crosswalk to be displayed in the direction of crossing the road, using a width of a lane of the road as a unit.

3. The information processing device according to claim 1, wherein the control unit outputs information for displaying an advance notice of display in a range in which the crosswalk is newly displayed, before displaying the crosswalk.

4. The information processing device according to claim 1, wherein the control unit determines a width of the crosswalk based on the number of pedestrians crossing the road.

5. The information processing device according to claim 1, wherein the control unit outputs information for erasing a crosswalk, out of the displayed crosswalk, in a range that the pedestrian crossing the road has passed through.

6. The information processing device according to claim 5, wherein the control unit outputs information for erasing the crosswalk in the range that the pedestrian crossing the road has passed through after a predetermined time has elapsed since the pedestrian crossing the road passed through the range.

7. The information processing device according to claim 5, wherein when erasing a crosswalk that a first crosser has passed through, the control unit outputs information for displaying a restriction indication to hinder a second crosser from entering the erased crosswalk.

8. The information processing device according to claim 7, wherein the control unit outputs information for placing an obstacle at an entrance to the erased crosswalk to hinder the second crosser from entering the erased crosswalk.

9. The information processing device according to claim 7, wherein the control unit outputs information for displaying an image corresponding to the restriction indication.

10. The information processing device according to claim 9, wherein the control unit outputs information for displaying the image corresponding to the restriction indication by a hologram or information for displaying the image corresponding to the restriction indication such that the second crosser recognizes the image as augmented reality.

11. The information processing device according to claim 7, wherein the control unit outputs the information for erasing the crosswalk after hindering the second crosser from entering.

12. An information processing system comprising:
the information processing device according to claim 1; and
a display device that displays the crosswalk based on the information from the information processing device.

13. An information processing method for controlling display of a crosswalk on a road on which a vehicle travels, the information processing method comprising:

determining a length of the crosswalk to be displayed in a direction of crossing the road, based on a speed of a pedestrian crossing the road; and outputting information on the crosswalk to be displayed in a range that is determined based on a state of the pedestrian crossing the road.

14. The information processing method according to claim 13, further comprising outputting information for displaying an advance notice of display in a range in which the crosswalk is newly displayed, before displaying the crosswalk.

15. The information processing method according to claim 13, further comprising outputting information for erasing a crosswalk, out of the displayed crosswalk, in a range that the pedestrian crossing the road has passed through.

16. A display device comprising:

a crosswalk display unit that displays a crosswalk on a road on which a vehicle travels; and a display control unit that controls the crosswalk display unit, wherein based on information on a crosswalk to be displayed in a range that is determined based on a state of a pedestrian crossing the road, the display control unit causes the crosswalk display unit to display the crosswalk, the information on the crosswalk being acquired from the information processing device, and based on information for erasing the crosswalk, the display control unit causes the crosswalk display unit to erase the crosswalk, the information for erasing the crosswalk being acquired from the information processing device.

17. The display device according to claim 16, further comprising a restriction display unit that displays a restriction indication, wherein based on information for displaying the restriction indication for hindering a pedestrian from entering the erased crosswalk, the display control unit causes the restriction display unit to display the restriction indication, the information for displaying the restriction indication being acquired from the information processing device.

* * * * *